(12) United States Patent
Suthar et al.

(10) Patent No.: US 12,413,972 B2
(45) Date of Patent: Sep. 9, 2025

(54) AUTHENTICATING RADIO ACCESS NETWORK COMPONENTS USING DISTRIBUTED LEDGER TECHNOLOGY

(71) Applicant: Cisco Technology, Inc., San Jose, CA (US)

(72) Inventors: Om Prakash Suthar, Bolingbrook, IL (US); Rajiv Asati, Morrisville, NC (US); Santanu Dasgupta, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 172 days.

(21) Appl. No.: 18/321,133

(22) Filed: May 22, 2023

(65) Prior Publication Data

US 2023/0292123 A1 Sep. 14, 2023

Related U.S. Application Data

(62) Division of application No. 16/546,826, filed on Aug. 21, 2019, now Pat. No. 11,706,617.

(Continued)

(51) Int. Cl.
*G06F 16/182* (2019.01)
*H04L 9/40* (2022.01)
(Continued)

(52) U.S. Cl.
CPC ........ *H04W 12/06* (2013.01); *G06F 16/1824* (2019.01); *H04L 63/101* (2013.01);
(Continued)

(58) Field of Classification Search
CPC ... H04W 12/06; H04W 12/041; H04W 60/00; H04W 76/25; H04W 12/08; H04W 60/04
See application file for complete search history.

(56) References Cited

U.S. PATENT DOCUMENTS 8,001,381 B2 8/2011 Metke et al.
2016/0295521 A1 10/2016 Grayson et al.
(Continued)

FOREIGN PATENT DOCUMENTS

CN 107734502 A 2/2018

OTHER PUBLICATIONS

Basnet, Sadhu Ram et al., "BSS: Blockchain Security over Software Defined Network", International Conference on Computing, Communication and Automation (ICCCA2017), https://ieeexplore.ieee.org/document/8229910, May 5-6, 2017, 6 pages.
(Continued)

*Primary Examiner* — Carl G Colin
*Assistant Examiner* — Andrew Suh
(74) *Attorney, Agent, or Firm* — Edell, Shapiro & Finnan, LLC

(57) ABSTRACT

Blockchain technology is used to provide distributed authentication, entitlements and trust among different virtual Radio Access Network (vRAN) elements. An enterprise blockchain with interfaces enables multi-vendor vRAN deployment across multiple service providers. In another embodiment, a method is provided for authenticating entities in a virtualized radio access network to ensure various entitles are in fact entitled to participate in various radio access network operations.

20 Claims, 10 Drawing Sheets

Related U.S. Application Data

(60) Provisional application No. 62/787,784, filed on Jan. 3, 2019.

(51) Int. Cl.
| | |
|---|---|
| *H04W 12/041* | (2021.01) |
| *H04W 12/06* | (2021.01) |
| *H04W 60/00* | (2009.01) |
| *H04W 76/25* | (2018.01) |

(52) U.S. Cl.
CPC ......... *H04W 12/041* (2021.01); *H04W 60/00* (2013.01); *H04W 76/25* (2018.02)

(56) References Cited

U.S. PATENT DOCUMENTS

| | | | |
|---|---|---|---|
| 2017/0257886 A1* | 9/2017 | Adjakple | H04W 74/04 |
| 2017/0352027 A1 | 12/2017 | Zhang et al. | |
| 2018/0097690 A1 | 4/2018 | Yocam et al. | |
| 2018/0270126 A1 | 9/2018 | Tapia | |
| 2018/0317157 A1* | 11/2018 | Baek | H04W 28/16 |
| 2019/0372837 A1 | 12/2019 | Yang et al. | |
| 2020/0042982 A1 | 2/2020 | Snow | |
| 2020/0068573 A1 | 2/2020 | Drozd et al. | |
| 2020/0218548 A1 | 7/2020 | Wan et al. | |
| 2021/0091994 A1* | 3/2021 | Meirosu | H04W 4/24 |
| 2021/0168705 A1* | 6/2021 | Fiorese | H04W 12/037 |
| 2022/0038289 A1 | 2/2022 | Huang | |

OTHER PUBLICATIONS

Sharma, Vishal et al., "Secure and Energy-Efficient Handover in Fog Networks Using Blockchain-Based DMM", IEEE Communications Magazine, May 2018, 10 pages.

Steichen, Mathis et al., "ChainGuard—A Firewall for Blockchain Applications using SDN with OpenFlow", https://ieeexplore.ieee.org/document/8169748, 2017 Principles, Systems and Applications of IP Telecommunications (IPTComm), Sep. 25-28, 2017, 8 pages.

ETSI, "5G; NG-RAN; Architecture description", 3GPP TS 38.401 version 15.3.0 Release 15, ETSI TS 138 401 V15.3.0, Sep. 2018, 41 pages.

ETSI, "LTE; General Packet Radio Service (GPRS) enhancements for Evolved Universal Terrestrial Radio Access Network (E-UTRAN) access", 3GPP TS 23.401 version 14.3.0 Release 14, ETSI TS 123 401 V14.3.0, May 2017, 393 pages.

Everson, Bob, "Open vRAN Ecosystem—Enabling a Better Mobile Architecture", Cisco Blog > SP360: Service Provider, Sep. 12, 2018, 4 pages.

3GPP, "3rd Generation Partnership Project; Technical Specification Group Radio Access Network; NR; NR and NG-RAN Overall Description; Stage 2 (Release 15)", 3GPP TS 38.300 V15.4.0, Dec. 2018, 97 pages.

3GPP, "3rd Generation Partnership Project; Technical Specification Group Services and System Aspects; System Architecture for the 5G System; Stage 2 (Release 15)", 3GPP TS 23.501 V15.3.0, Sep. 2018, 226 pages.

Ahmad, Ijaz et al., "5G Security: Analysis of Threats and Solutions", 2017 IEEE Conference on Standards for Communications and Networking (CSCN), https://ieeexplore.ieee.org/document/8088621, Sep. 18-20, 2017, 7 pages.

5G PPP Security WG, "5G PPP Phase 1 Security Landscape", Jun. 2017, 68 pages.

Yang, Hui et al., "Blockchain-based trusted authentication in cloud radio over fiber network for 5G", Aug. 2017, 4 pages.

Frazer, Atchison, "Is There a Future for Blockchain-Enabled SD-WAN?", Nov. 14, 2017, 2 pages.

3GPP, "3rd Generation Partnership Project; Technical Specification Group Services and System Aspects; Security architecture and procedures for 5G system (Release 15)," Technical Specification, 3GPP TS 33.501, V15.5.0, Jun. 2019, 190 pages.

\* cited by examiner

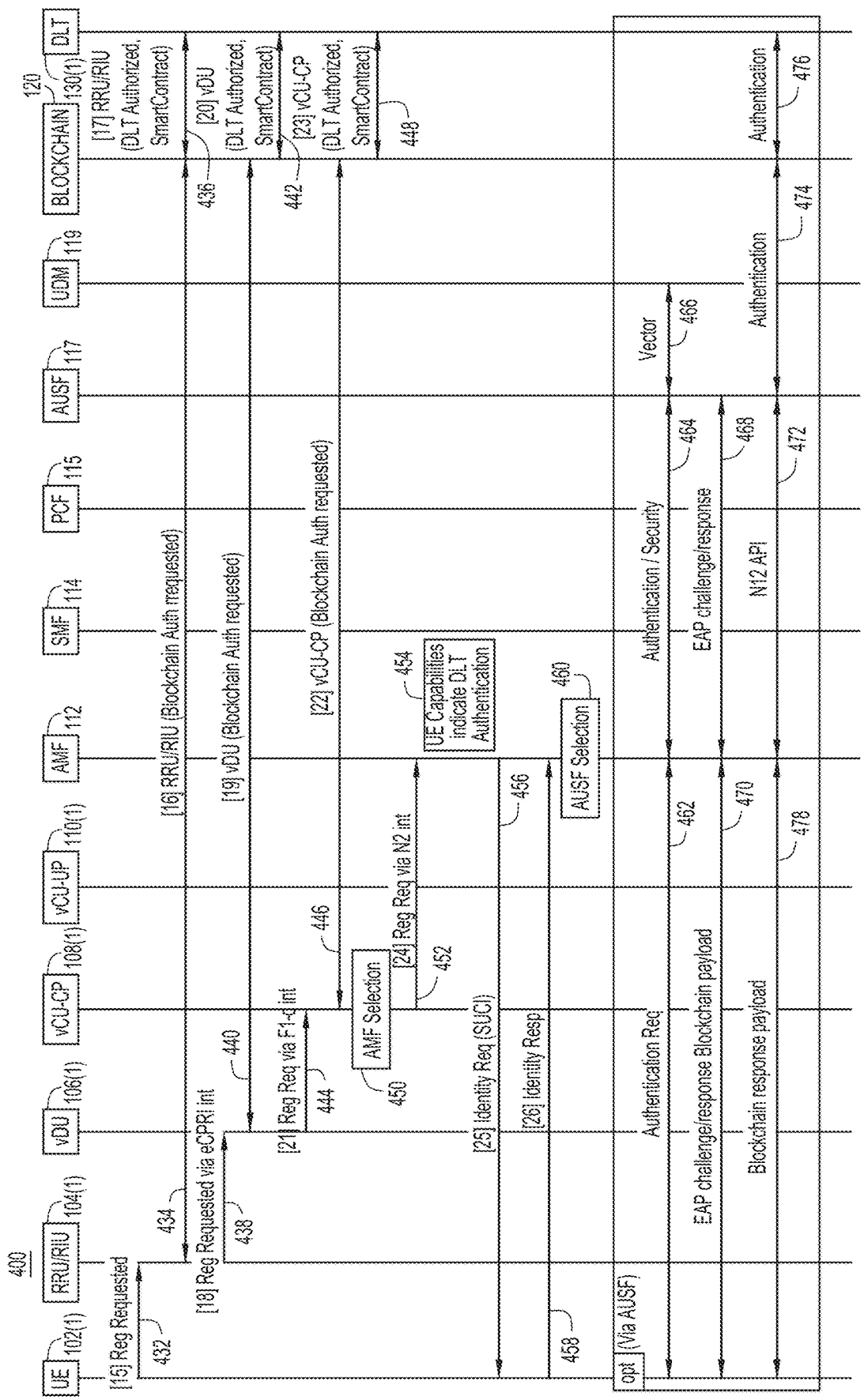

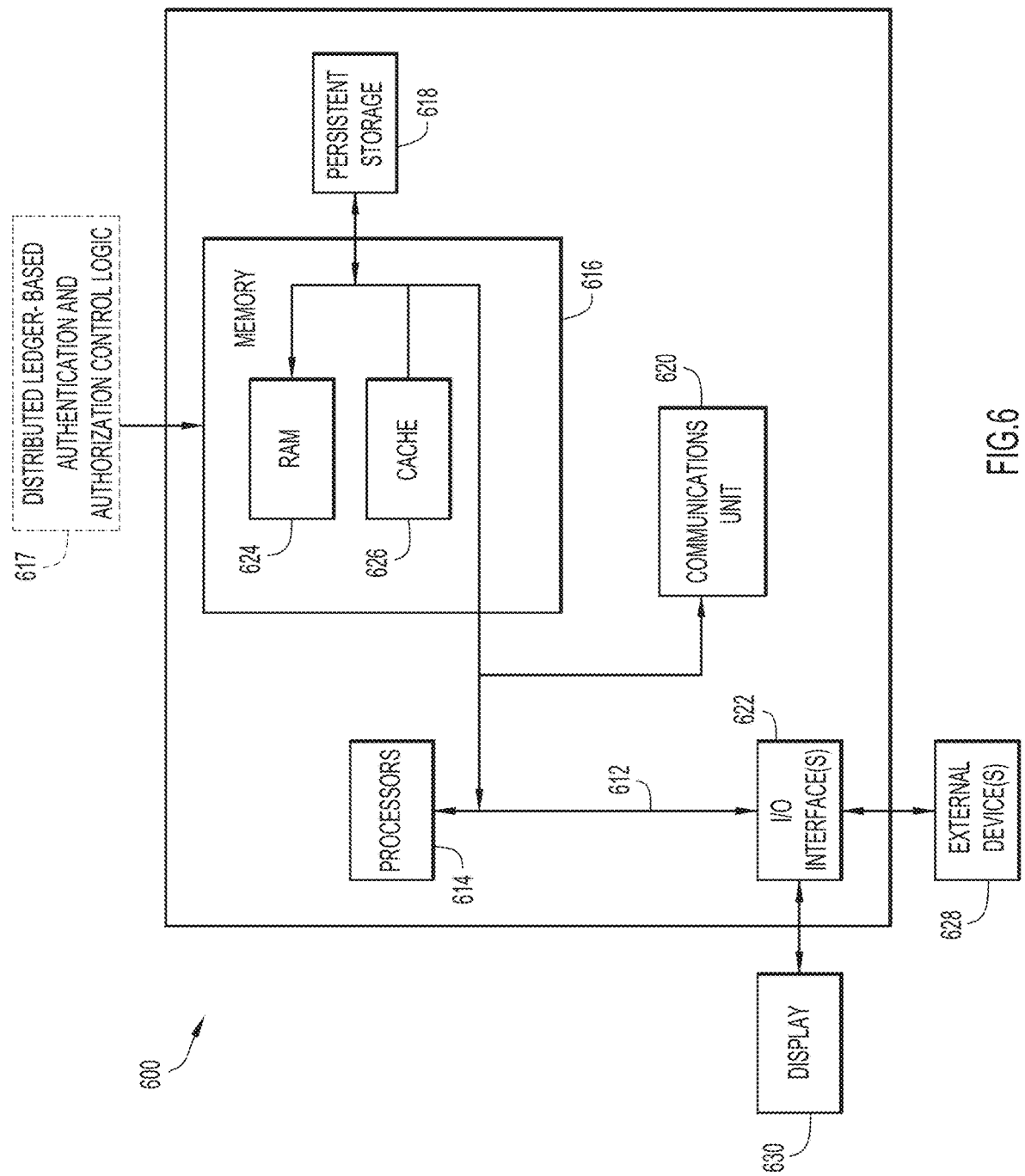

AUTHENTICATING RADIO ACCESS NETWORK COMPONENTS USING DISTRIBUTED LEDGER TECHNOLOGY

PRIORITY CLAIM

This application is a division of and claims the benefit of priority to U.S. patent application Ser. No. 16/546,826, filed Aug. 21, 2019, now U.S. Pat. No. 11,706,617, which claims priority to U.S. Provisional Application No. 62/787,784, filed Jan. 3, 2019, the entirety of which applications are incorporated herein by reference.

TECHNICAL FIELD

The present disclosure relates to a mobile core infrastructure network.

BACKGROUND

The Advanced Long Term Evolution (LTE) and Fifth Generation (5G) wireless core network architectures use a virtualized radio access network (vRAN) to derive benefits of new technologies. A vRAN is disaggregated solution that includes a Remote Radio Unit (RRU), Antennas, a virtualized Distributed Unit (vDU), a virtualized Control Unit (vCU) and an Element Manager (EMS).

BRIEF DESCRIPTION OF THE DRAWINGS

FIGS. 4A-4C depict a message flow between entities for blockchain authentication in a virtualized radio access network, according to another example embodiment.

FIG. 6 is a diagram of a computing device that may be configured to perform the functions described herein, according to an example embodiment.

DESCRIPTION OF EXAMPLE EMBODIMENTS

Overview

Figure 1:
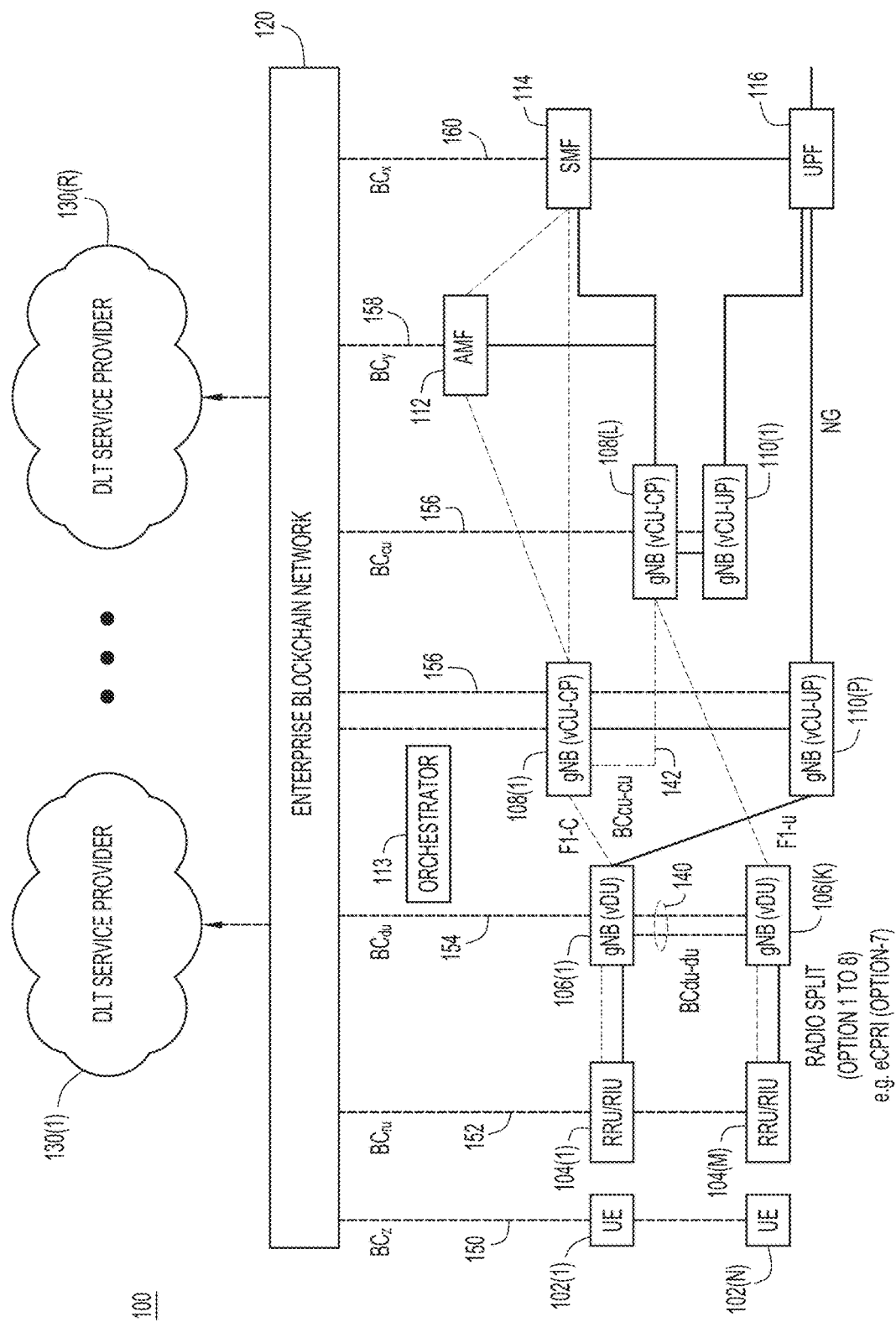
FIG. 1 is a diagram of a mobile core infrastructure network in which multi-vendor virtualized radio access network components may be authorized using blockchain technology, according to an example, embodiment.

Blockchain technology is used to provide distributed authentication, entitlements and trust among different virtualized radio access network (vRAN) components. In one embodiment, an enterprise blockchain with interfaces enables multi-vendor vRAN deployment. For example, a method is provide including registering with a distributed ledger a first radio access network (RAN) entity of a first vendor and a second RAN entity of a second vendor; obtaining a request from the first RAN entity of the first vendor to use resources of the second RAN entity of the second vendor; validating with the distributed ledger whether the first RAN entity of the first vendor and the second RAN entity of the second vendor have been registered with the distributed ledger and are to share resources; and based on the validating, providing to the second RAN entity of the second vendor a notification that the first RAN entity of the first vendor is to be permitted to share resources of the second RAN entity of the second vendor.

In another embodiment, a method is provided for authenticating entities in a virtualized radio access network to ensure various entitles are in fact entitled to participate in various radio access network operations. The method includes: obtaining at a radio resource unit entity of a radio access network, a registration request from a user equipment device for the user equipment device to attach to the radio access network, the registration request including registration type information to indicate an extended authentication procedure for the user equipment device; obtaining, by the radio resource unit entity, from a distributed ledger an authorization for attachment of the user equipment device to proceed; providing, by the radio resource unit entity, a registration request to a virtual distributed unit entity of the radio access network; obtaining, by the virtualized distributed unit entity, from the distributed ledger an authorization for attachment of the user equipment device to proceed; providing, by the virtualized distributed unit entity, to a virtual control unit control plane entity an attach request; obtaining, by the virtualized control unit control plane entity, from the distributed ledger an authorization for attachment of the user equipment device to proceed; selecting, by the virtualized control unit control plane entity, an access management function, in a mobile core network; and providing, by the virtualized control unit control plane entity, to the access management function, an attach request for the user equipment device, the attach request including information indicating that the user equipment device is capable of the extended authentication procedure.

EXAMPLE EMBODIMENTS

It is envisaged that with 5G mobile core network solutions, most of the virtualized radio functions/functions will be deployed in a multi-vendor environment. Such an environment poses a situation of "zero trust" among all participants and therefore uses a highly secure and scalable authentication mechanism that can be deployed across different vendors, different operators within a Service Provider and also among different Services Providers. With RAN disaggregation, one major benefit is enhanced radio coordination among different vendors. Radio coordination enables a wide array of capabilities such as Carrier Aggregation, Coordinated Multi-point (CoMP), Enhanced Inter-Cell Interference Coordination (eICIC), Massive/Multi-User Multiple-Input Multiple-Output (MU-MIMO), Network-MIMO etc., which enhances spectral efficiency, has higher bandwidth and provides better quality of experience for end users.

This involves coordination between the disaggregated RAN components such as DU to DU and CU to CU, in a secured and scalable manner. More specifically, a vDU is authenticated and authorized to inter-work with another vDU in a multi-vendor deployment for radio coordination. In addition, a vCU-Control Plane (vCU-CP) is authenticated and authorized to another vCU-CP in a multi-vendor deployment for radio coordination.

It is to be understood that a plurality of different vendors may provide/distribute any one of the RAN entities shown in FIG. 1. For example, an arbitrary first vendor may provide vDU1 106(1), an arbitrary second vendor may provide vCU-CP1 108(1), an arbitrary third vendor may provide vCU-UP1 110(1), and so on. vDU1 106(1), vCU-CP1 108(1), vCU-CP1 110(1) may all be provided by the same vendor, but that is not required or meant to be indicated by the index (1). Thus, the index in the reference numerals used in text and figures is not meant to imply a vendor association.

A disaggregated RAN architecture involves the split of the NodeB (gNB) into a virtualized Central Unit (vCU) and one or several vDUs. Standardization of the interface between the vCU and the vDU allows for implementation of the components of these two types by different vendors, which is widely considered the way to reduce RAN cost of ownership. Further disaggregation of the RAN base station may include separation of the entity that makes intelligent decisions, from the rest of the base station or, in case of the disaggregated RAN, the vCU-CP, which is the Control Plane part of the vCU. Each vCU-CP entity can control one or more vDUs. The vCU-UP entity handles user plane (user traffic) from one or more vDUs. Each vDU provides lower-layer radio message processing from a Remote Radio Unit (RRU) to enable wireless radio frequency communication via antennas (not shown in FIG. 1 for simplicity) to wirelessly communicate with UEs.

FIG. 1 is a diagram of a mobile core network 100 that includes User Equipment (UEs) 102(1)-102(N), Remote Radio Unit/Remote Interface Unit (RRU/RIU) entities 104(1)-104(M), next generation NodeB (gNB)/(vDU) entities 106(1)-106(K), gNB(vCU-CP) entities 108(1)-108(L), gNB (vCU-User Plane (UP)) entities 110(1)-110(P), Access and Mobility Management function (AMF) 112, a Session Management Function (SMF) 114 and a User Plane Function (UPF) 116. An orchestrator 113 initially instantiates the various vDU, vCU-CP, and vCU-UP entities based on resource requirements.

The different RRU/RIU's 104(1)-104(M) may be from different mobile core network solution vendors. For example, a first vendor of mobile core network solutions may manufacture/distribute RRU/RIU 104(1), a second vendor of mobile core network solutions may manufacture/distribute RRU/RIU 104(2) and so on. Likewise, a first vendor of mobile core network solutions may manufacture/distribute vDU 106(1), a second vendor of mobile core network solutions may manufacture/distribute vDU 106(2), and so on. Similarly, a first vendor of mobile core network solutions may manufacture/distribute vCU-CP 108(1), a second vendor of mobile core network solutions may manufacture/distribute vCU-CP 108(2), and so on. Further, a first vendor of mobile core network solutions may manufacture/distribute vCU-UP 110(1), a second vendor of mobile core network solutions may manufacture/distribute vCU-UP 110(2), and so on.

In accordance with one embodiment, distributed ledger technology (DLT) is leveraged to provide authentication for virtualized radio functions in a multi-vendor environment to enable the virtualized radio functions to communicate with each other, whether for a single Service Provider or multiple Service Providers that tend to have limited or zero implicit trust. DLT is used with hierarchical approach to authenticate and authorize deployment of multi-vendor vRAN elements.

Generally, in accordance with one embodiment, the solution is as follows.

vRAN virtual network functions (VNFs) (e.g. vDU and vCU) of each vendor register to a distributed ledger (via enterprise blockchain network 120 and DLT service providers 130(1)) and receive a public certificate at their respective factory/vendor facility.

vRAN VNFs are shipped by radio vendors to a Service Provider either using a secure-download technology (e.g., Secure File Transfer Protocol (SFTP)) or integrated with a continuous integration/continuous delivery pipeline using a repository, such as Artifactory™. Each vRAN VNF is authenticated with blockchain DLT from vendor and provided with public key with security certificate to Service Provider.

vRAN VNFs are integrated subject to DLT authentications by the Service Provider (SP). The DLT service providers 130(1)-130(R) form a federation among each other and also with the Service Provider so that each VNF is authenticated and a certificate is updated by DLT service provider.

The communication among vDUs, vCUs from different vendors is authorized using smart contracts so that it these entities can communicate and agree on protocols, parameters, extensions and usage of interfaces for signaling and user data traffic. The orchestrator 113 monitors and manages utilization of resources among already active vRAN VNFs.

For blockchain authentication and authorization, new interfaces are defined including BCru, BCdu, BCcu, BCdu-du, and BCcu-cu. Currently, 3GPP defines only Evolved Common Public Radio Interface (eCPRI) F1-c, F1-u for radio elements communications without any implicit authentication.

Blockchains use distributed ledger technology (DLT) with built-in cryptography enabling open and trusted exchanges over the Internet/Intranet without using central servers or an independent trusted authority. Blockchains facilitate transparent, verifiable, and secure digital asset transactions with proof of rights and ownership. FIG. 1 shows an enterprise blockchain network 120 that is used to perform a variety of functions for the mobile core network 100, including authentication, entitlement, mediation, execution of smart contracts, accounting, etc. The enterprise blockchain network 120 is in communication with one or more distributed ledger technology (DLT) service providers 130(1)-130(R). In one example, the enterprise blockchain network may use Sawtooth™ blockchain technology developed and licensed by Hyperledger.

A smart contract (also "smart contract") is a computer protocol intended to digitally facilitate, verify, or enforce the negotiation or performance of a contract. Smart contracts allow the performance of credible transactions without third parties. More specifically, smart contracts are self-executing contractual states, stored on the blockchain, which no entity controls, and therefore everyone can trust.

The BCdu-du and BCcu-cu interfaces shown at 140 and 142 are two new interfaces with an open Application Programming Interface (API) for secured coordination between vDUs and vCUs in a multi-vendor environment that can handle different messages, such as standalone authentication public key pre-set, authorization, query/set, parameter modifications, etc. Specifically, these interfaces perform functions described below.

BCdu-du Interface. This interface enables peer authentication between (v)DU to (v)DU (for both physical and virtual implementations). An eNB or gNB DU is a network function that may or may not be virtualized and may be deployed at the edge. The BCdu-du interface 140 interface enables peer authentication between (v)DU to (v)DU (for both physical and virtual implementations) and it handles handover messages when a UE moves.

DU or vDU VNFs register to DLT at factory (vendor facility). These entities receive a public-key from blockchain provider before shipping to a Service Provider either electronically or via CI/CD pipeline.

The vDU may be pre-set with a blockchain key by a manufacturer or Service Provider (warehouse/testing) before shipping to Service Provider sites in the event the DU is a physical network function. During the deployment of vDU VNF, authentication and signing (provided with DLT key exchange) can be used to validate interfaces between a vDU of a first vendor and a vDU of a second vendor. This process can establish trust and eliminate the possibility of any rogue vDU in a multi-vendor environment. Authentication of other partners' vDU (peer vDU) can be achieved using whitelist concepts, which can be programmed using an automation system. A peer vDU will provide its identity using blockchain messages so that it can be authenticated.

BCcu-cu Interface. eNB or gNB CU is a VNF performing the upper layer radio functions (e.g., Packet Data Convergence Protocol (PDCP), Radio Resource Control (RRC)). Many Service Providers decompose the control and user plane of the vCU into vCU-CP and vCU-UP, as shown in FIG. 1. The BCcu-cu interface 142 enables peer authentication between a monolithic vCU to another vCU and between a decomposed vCU-CP to another vCU-CP. During the deployment of a vCU and/or vCU-CP, authentication and signing via the distribute ledger can be used to validate X2/Xx interfaces between tone vCU and another vCU (or one vCU-CP to another vCU-CP). This allows for trust and eliminates the possibility of any rogue vCU or vCU-CP in a multi-vendor environment.

The vCU VNF has two separate entities vCU-CP (for control plane messaging) and vCU-UP (for user plane traffic). These entities register to the distributed ledger at the factory (vendor facility). These entities receive a certificate and Public-key from a DLT service provider before shipping to Service Provider either electronically or via a CI/CD pipeline.

For the sake of completeness, FIG. 1 also shows UEs 102(1)-102(N) authenticating with the enterprise blockchain network 120 via an interface called the BCz interface 150, the RRU/RIU entities 104(1)-104(M) authenticating with the enterprise blockchain network 120 via an BCru interface 152, the gNB(vDU) entities 106(1)-106(K) authenticating via the BCdu interface 154, the vCU-CP entities 108(1)-108 (L) and vCU-UP entities 110(1)-110(P) authenticating via a BCcu interface 156, the AMF 112 authenticating via a BCy interface 158 and the SMF 114 authenticating via a BCx interface 160.

During the deployment of a vCU and/or a vCU-CP virtualized network function, authentication and signing (provided with a DLT key exchange) can be used to validate X2/Xx interfaces between vCU and another vCU (or vCU-CP to another vCU-CP). This process can establish trust and eliminate the possibility of any rogue vCU or vCU-CP in a multi-vendor environment. Moreover, this allows for authentication of other partners' vCU and/or vCU-CP (peer) using whitelist concepts. A vCU and/or vCU-CP will provide its identity using blockchain messages so it can be authenticated.

Figure 2A:
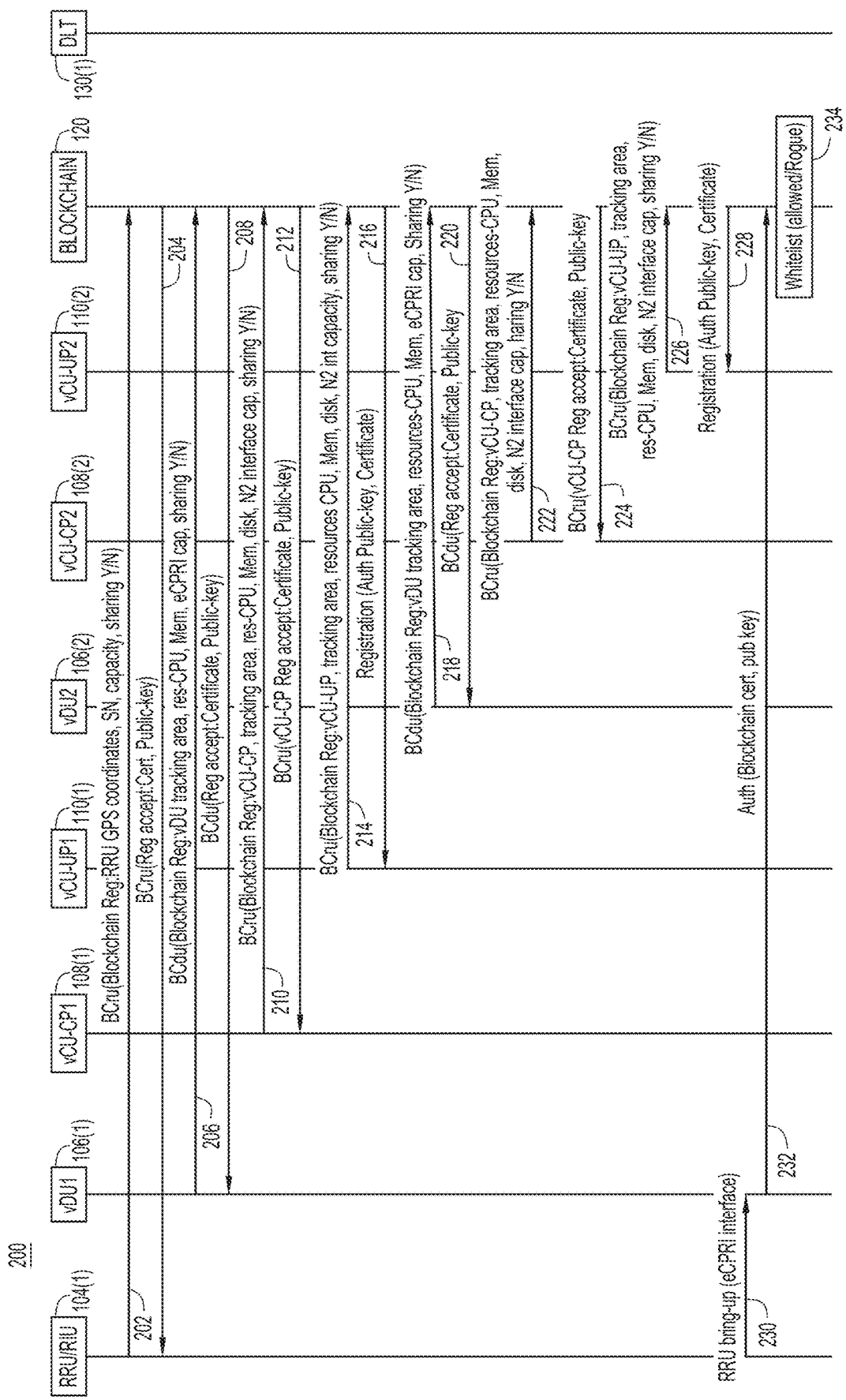
FIGS. 2A-2C depict a message flow between entities to facilitate authentication and authorization of multi-vendor virtualized radio access network components using blockchain distributed ledger technology (DLT) and smart contracts, according to an example embodiment.
Figure 2B:
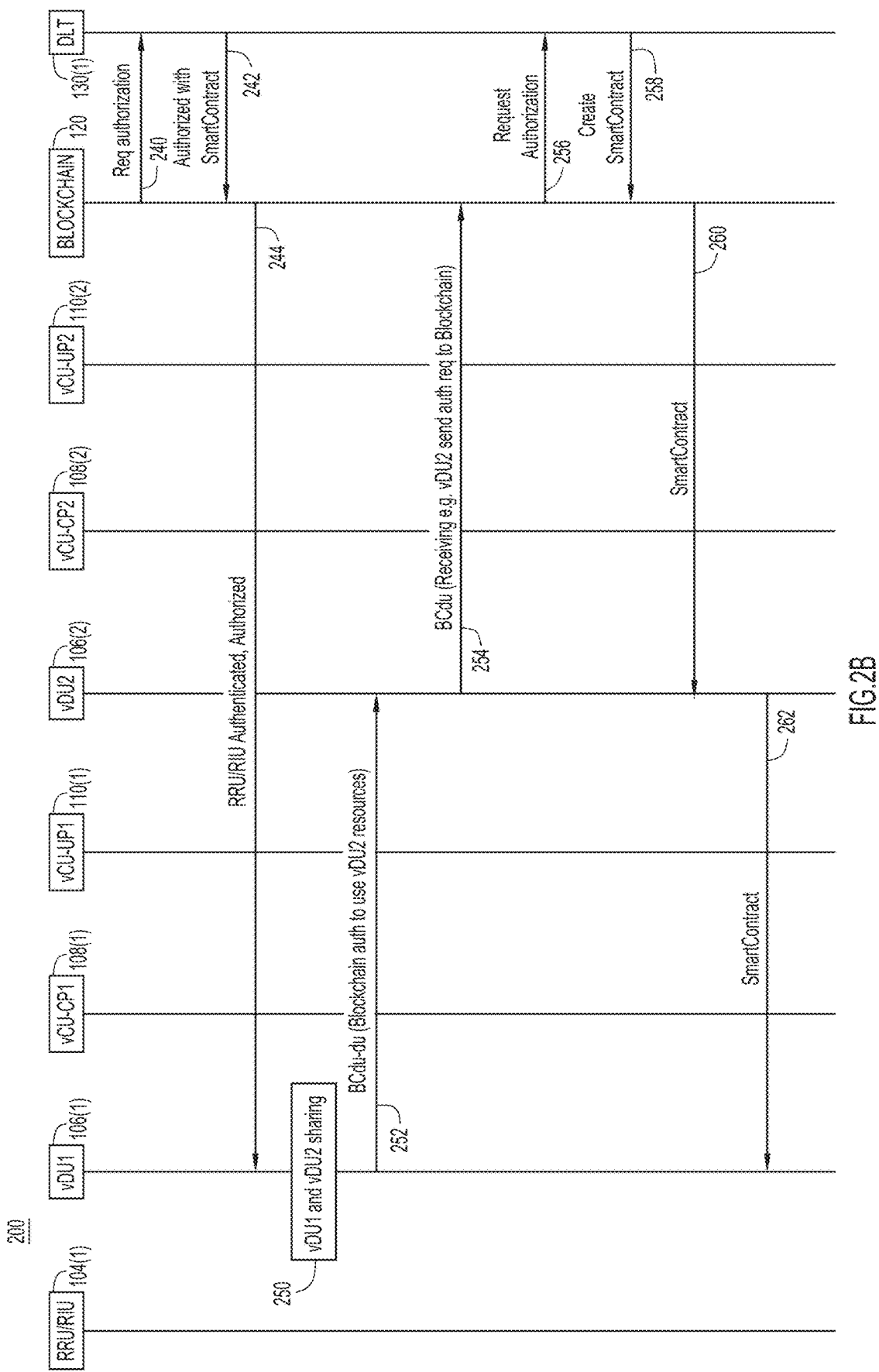
Figure 2C:
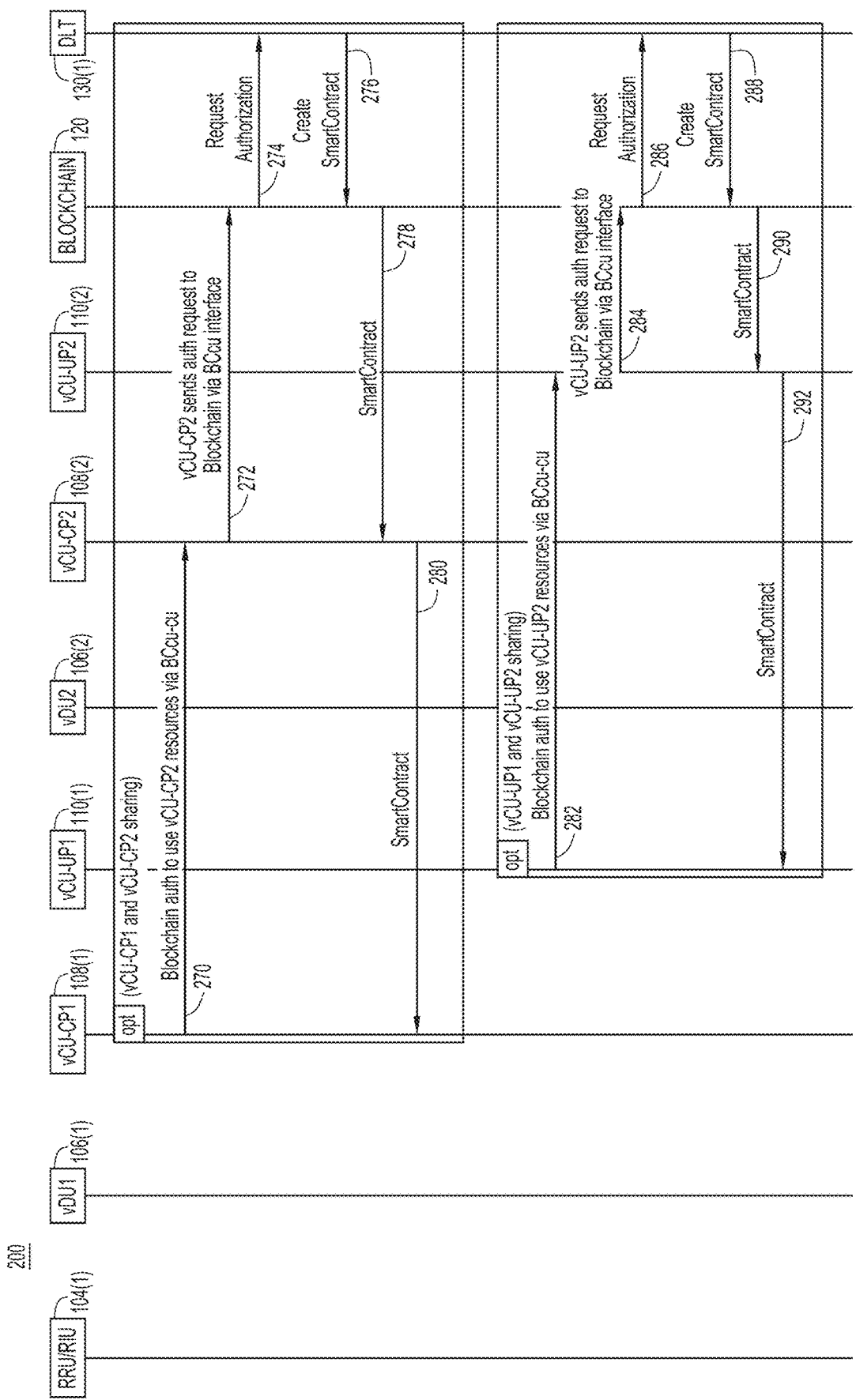

FIGS. 2A-2C illustrate a messaging sequence 200. In this example message sequence, there are interactions between RRU/RIU 104(1), a first vDU (vDU1) 106(1), a first vCU-CP1 (vCU-CP1) 108(1), and a first vCU-UP (vCU-UP1) 110(1) associated with a first vendor and a second vDU (vDU2) 106(2), a second vCU-CP2 (vCU-CP2) 108(2), and a second vCU-UP (vCU-UP2) 110(2) associated with a second vendor, the enterprise blockchain network 120 and a DLT service provider, e.g., DLT service provider 130(1).

In FIG. 2A, operations 202 and 204 involve the RRU/RIU registering with the blockchain network 120. Specifically, at 202, the RRU/RIU 104(1) sends a registration request via the BCru interface 152 to the enterprise blockchain network 120, the registration request including information related to the GPS location of the RRU/RIU entity 104(1), Serial Number, Capacity and a yes/no (Y/N) flag indicating whether the RRU/RIU entity 104(1) can be shared. At 204, the enterprise blockchain network 120 responds with a registration acceptance message (via the BCru interface 152) that includes a certificate and public key (Public-key), which is sent back to the RRU/RIU entity 104(1).

At 206, vDU1 106(1) sends a registration request message to register with the blockhain network 120. This registration request message includes information related to tracking area, central processing unit (CPU) resources, memory resources, eCPRI options, capacity, and a sharing flag. Other vDU parameters that may be provided at 206 include, Field Programming Gate Array (FPGA) resources, Remote Software Upgrade options, vCPU, virtual disk (vDisk) support/capacity, CPU pinning, Single-Root Input/Output Virtualization (SRIOV) parameters, Internet Protocol v4/v6 (IPv4v6) capability, and license activation key. In addition, vDU1 may provide a vDU whitelist (exclusive allow)/blacklist (deny) with other partners vDUs). This can be programmed using an automation system during deployment. At 208, the enterprise blockchain network 120 responds with a registration acceptance message that includes a certificate and a Public-key.

Similarly, at 210 and 212, vCU-CP1 108(1) registers with the enterprise blockchain network 120, and at 214 and 216, vCU-UP1 registers with the enterprise blockchain network 120. The registration request that the vCU-CP1 108(1) sends at 210 includes information related to tracking area, CPU resources, memory resources, disk resources, N2 interface, capacity and a sharing flag (Y/N). Likewise, the registration request that the vCU-UP1 110(1) sends at 214 includes information related to tracking area, CPU resources, memory resources, disk resources, N2 interface, capacity and a sharing flag (Y/N). Again, when the sharing flag is set to "Y" this indications that the vCU-UP or vCU-CP can provide additional attributes, such as resources available for sharing. Additional vCU-CP and vCU-UP parameters that may be included in the registration requests 210 and 214 include F1-c, F1-u specifications and capacity, vCPU capabilities, vDisk capabilities, CPU pinning, SRIOV details, IPv4/v6 capabilities and license activation key. Furthermore, a vCU-CP entity or vCU-UP entity may include a whitelist (exclusive allow)/blacklist (deny) with other peer vCU entities, which can be programmed via an automation system during deployment.

In a very similar manner, at 218 and 220, vDU2 106(2) registers with the enterprise blockchain network 120, at 222 and 224, vCU-CPU2 108(2) registers with the enterprise blockchain network 120, and at 226 and 228, vCU-UP2 110(2) registers with the enterprise blockchain network 120.

At 230, the RRU/RIU entity 104(1) is brought online on an eCPRI. This may trigger a vDU, e.g., vDU1 106(1) to authenticate with the enterprise blockchain network 120 in order to determine whether it is permitted access to the RRU/RIU entity 104(1). For example, at 232, vDU1 106(1) authenticates with the enterprise blockchain network 120. As shown at 234 in in FIG. 2A, vDU1 is either authenticated (Allowed) and if it is not authenticated, then it is deemed a Rogue.

Reference is now made to FIG. 2B. Operations 240 and 242 in FIG. 2B show the interaction between the enterprise blockchain network 120 and DLT service provider 130(1) in order to perform the authorization of the RRU/RIU 104(1). At 240, the enterprise blockchain network 120 sends an authorization request to the DLT service provider 130(1) and at 242, the DLT service provider 130(1) responds with an authorization notification and a smart contract for VDU1 106(1). At 244, the enterprise blockchain network 120 forwards to the vDU1 106(1) an notification that the RRU/RIU entity 104(1) is authenticated/authorized, together with the smart contract for vDU1 106(1).

Sharing of resources of vDU1 106(1) with resources of vDU2 106(2) denoted at 250 involves further operations as shown at operations 252-280 for authorizing vDU1 106(1) to use resources of vDU2 106(2), for example. At 252, vDU1 106(1) sends, via the BCdu-du interface 140, a communication for blockchain authorization of vDU1 106 (1) to use resources of vDU2 106(2). At 254, vDU2 106(2) sends to the enterprise blockchain network 120, via the BCdu interface 154, an authorization request to the blockchain. At 256, the enterprise blockchain network 120 forwards the authorization request to the DLT service provider 130(1), and upon authorization, at 258, the DLT service provider 130(1) returns a smart contract to the enterprise blockchain network 120. At 260, the enterprise blockchain network 120 returns the smart contract key to vDU2 106(2), which in turn, forwards the smart contract key to vDU1 106(1), at 262. The smart contract key contains the vDU-vDU sharing parameters. In particular, the smart contract includes the identity of vDU1 and vDU2, and sharing entitlement parameters as specified during registration with the distributed ledger by vDU1 and vDU2 as depicted in FIG. 2A. Thereafter, vDU1 106(1) and vDU2 106(2) can share resources under the smart contract obtained from the DLT service provider 130(1).

Reference is now made to FIG. 2C for explanation of operations that may be used to enable sharing of resources between vCU-CP1 108(1) and vCU-CP2 108(2), and to enable sharing of resources between vCU-UP1 110(1) and vCU-UP2 110(2). Specifically, operations 270-280 are for enabling sharing between vCU-CP1 108(1) and vCU-CP2 108(2), and operations 282-292 are for enabling sharing of resources between vCU-UP1 110(1) and vCU-UP2 110(2).

At 270, vCU-CPU1 108(1) sends, via the BCcu-cu interface 142, a blockchain authorization request to use resources of vCU-CP2 108(2). At 272, vCU-CP2 sends the authorization request to the enterprise blockchain network 120 via the BCcu interface 156. At 274, the enterprise blockchain network 120 sends the authorization request to the DLT service provider 130(1). At 276, upon authorization of the request, the DLT service provider 130(1) creates with a smart contract and sends the smart contract to the enterprise blockchain network 120. At 278, the enterprise blockchain network forwards the smart contract key to the vCU-CP2 108(2). At 280, the vCU-CP2 108(2) forwards the smart contract key to the vCU-CP1 108(1), and thereafter, the vCU-CP1 108(1) can use resources of vCU-CP2 108(2) per the terms of the smart contract. The smart contract key sent at 278 and 280 describes the parameters to enable vCU-CP to vCU-CP resource sharing.

A similar process is performed at operations 282-292 for sharing of resources between vCU-UP1 110(1) and vCU-UP2 110(2). At 282, vCU-UP1 110(1) sends, via the BCcu-cu interface 142, a blockchain authorization request to use resources of vCU-UP2 110(2). At 284, vCU-UP2 110(2) sends the authorization request to the enterprise blockchain network 120 via the BCcu interface 156. At 286, the enterprise blockchain network 120 sends the authorization request to the DLT service provider 130(1). At 288, upon authorization of the request, the DLT service provider 130 (1) creates with a smart contract and sends the smart contract to the enterprise blockchain network 120. At 290, the enterprise blockchain network forwards the smart contract to the vCU-UP2 110(2). At 292, the vCU-UP2 110(2) forwards the smart contract to the vCU-UP1 110(1), and thereafter, the vCU-UP1 110(1) can use resources of vCU-UP2 110(2) per the terms of the smart contract. The smart contract sent at 290 and 292 describes the parameters to enable vCU-UP to vCU-UP resource sharing.

What is meant by (dynamic) sharing of resources is now further described. In association with UEs, there are mobility session management details including bandwidth each user is allowed, user entitlement information, IP addresses of UEs, bandwidth allocated for uplink and downlink communications for each UE, etc. At any given period of time, one RAN entity may be fully utilized whereas another RAN entity is not fully utilized. For example, vDU1 may be fully utilized and need additional resources, whereas vDU1 is not being fully utilized and has resources it could share. Such resources that vDU2 may share may include compute, memory as well as frequency bandwidth resources, etc., in order to serve communications with more UEs. Thus, after step 262 in FIG. 2B, compute, memory, bandwidth resources, etc., of vDU2 (of a second vendor) may be used by vDU1 to serve the communication sessions that vDU1 (of a first vendor) would not otherwise be able to serve.

Similarly, vCU-CP1 108(1) (of a first vendor) may be fully utilized and need additional resources to serve the control plane functions that it needs to serve, whereas vCU-CP2 108(2) (of a second vendor) is not being fully utilized. Thus, after step 280 in FIG. 2C, vCU-CP1 108(1) may use compute, memory, etc., resources of vCU-CP2 108(2) in order to meet the needs of the control plane functions that vCU-CP1 108(1) is handling.

Further still, vCU-CP2 108(2) (of a first vendor) may be fully utilized and need additional resources to serve the user plane functions that it needs to serve, whereas vCU-UP2 110(2) is not being fully utilized. After step 292 in FIG. 2C, vCU-CUP1 may use compute, memory, etc., resources of vCU-UP2 in order to meet the user plane functions vCU-UP1 110(1) is handling.

Figure 3:
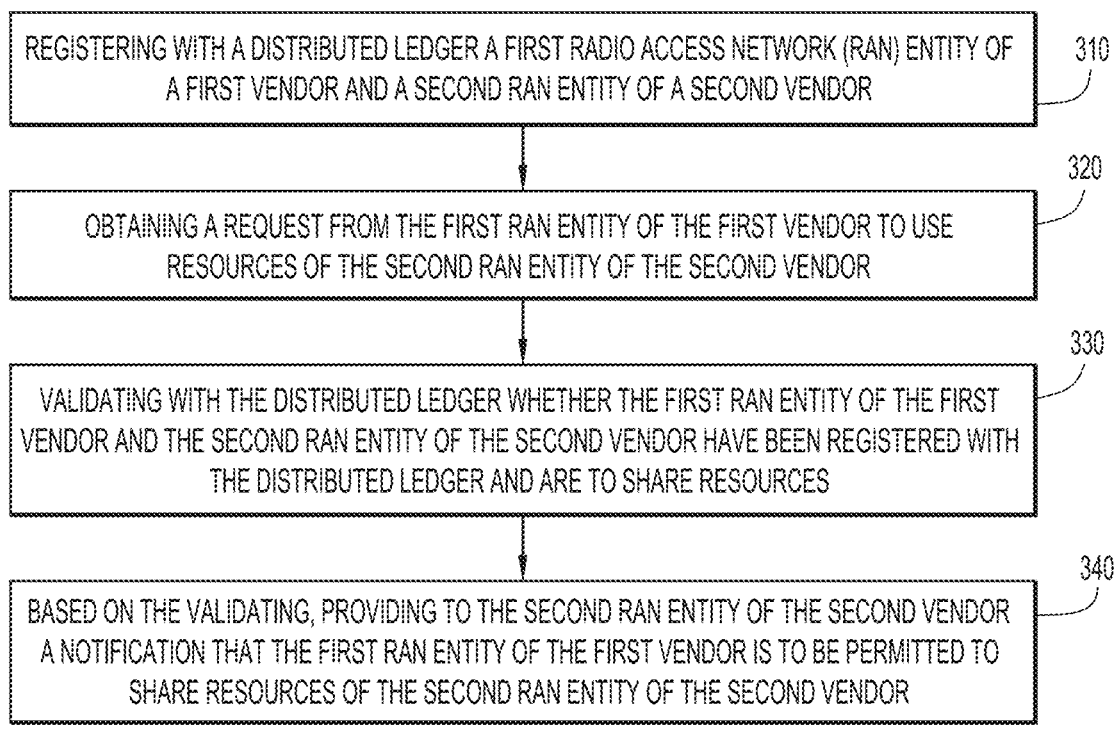
FIG. 3 is a flow chart depicting a method for authentication and authorization of multi-vendor virtualized radio access network components, according to an example embodiment.

Reference is now made to FIG. 3. FIG. 3 shows a flow chart of a method 300 performed by server or other computing entity in the blockchain network 120 (or by one of the DLT service providers 130(1)-130(R)). At 310, a first radio access network (RAN) entity of a first vendor and a second RAN entity of a second vendor are registered with a distributed ledger. This is depicted in more detail in operations 202-228 in FIG. 2A. At 320, a request is received from the first RAN entity of the first vendor to use resources of the second RAN entity of the second vendor. This is shown, for example, at operation 254 (for vDU resource sharing) in FIG. 2B, and operation 272 (for vCU-CP resource sharing) and operation 284 (for vCU-UP resource sharing) in FIG. 2C.

At 330, the blockchain network 120 and/or the DLT service provider validates with the distributed ledger whether the first RAN entity of the first vendor and the second RAN entity of the second vendor have been registered with the distributed ledger and are to share resources. For example, this shown in more detail at operation 256 in FIG. 2B and operations 274 and 286 in FIG. 2C.

At 340, based on the outcome of the validating of operation 330, the blockchain network 120 and/or the DLT service provider provides to the second RAN entity of the second vendor a notification that the first RAN entity of the first vendor is to be permitted to share resources of the second RAN entity of the second vendor. For example, this is shown in more detail at operations 258 and 260 in FIG. 2B, and at operations 276 and 278 as well as 288 and 290 in FIG. 2C.

As explained above in connection with FIGS. 2A-2C, the registering operation 310 may further including: obtaining from the first RAN entity of the first vendor and from the second RAN entity of the second vendor information including geographical location, serial number, processing capacity, memory capacity and a flag indicating whether or not resources are to be shared. Thus, the validating operation 330 is performed based on the information obtained from the first RAN entity and from the second RAN entity. Furthermore, the information obtained from the first RAN entity and from the second RAN entity may include one or more of: eCPRI options, Field Programming Gate Array (FPGA) resources, remote software upgrade options, vCPU capabilities, virtual disk support/capacity, CPU pinning parameters, SRIOV parameters, IPv4v6 capability, and license activation key. Examples of eCPRI options are those as defined in 3GPP RAN specifications, and may include Split A (Option 1), Split B (Option 2), Split C (Option 4), Split D (Option 6) and Split E (Option 8).

Furthermore, as described above, when obtaining information from RAN entities, the information may include information for a whitelist of other RAN entities that are exclusively allowed for sharing resources and/or for a blacklist of other RAN entities that are denied permission for sharing resources, and the validating operation 330 may be based on the whitelist and/or the blacklist.

Further still, operation 340 may include providing a smart contract to the second RAN entity of the second vendor, the smart contract defining parameters under which the first RAN entity of the first vendor is permitted to share resources with the second RAN entity of the second vendor. For example, this is shown in more detail at operations 260 and 262 in FIG. 2B, and at operations 278 and 280, and operations 290 and 292 in FIG. 2C.

The registering operation 310 may include the blockchain network and/or DLT service provider providing to the first RAN entity of the first vendor and to the second RAN entity of the second vendor a certificate and a public key.

As described above, the first RAN entity of the first vendor and the second RAN entity of the second vendor may each be a virtual component or a physical component of a disaggregated base station. Similarly, the first RAN entity of the first vendor and the second RAN entity of the second vendor may each be a virtual control unit entity of a disaggregated base station. Moreover, the first RAN entity of the first vendor and the second RAN entity of the second vendor may each be a virtual control unit-control plane entity of a disaggregated base station, and the first RAN entity of the first vendor and the first RAN entity of the second vendor may each be a virtual control unit-control user plane entity of a disaggregated base station.

In summary, in accordance with the embodiment depicted in FIGS. 2A, 2B and 3, distributed ledger technology is used to provide distributed authentication, entitlements and trust among different vRAN elements. Deployment of enterprise blockchain with new interfaces for vRAN can open up opportunities for multi-vendor vRAN deployment across multiple service providers.

Thus, as described above, interfaces are constructed using Open API for secured coordination between vDUs and vCUs in a multi-vendor environment that can handle different messages such as standalone authentication public key preset, authorization, query/set etc.

Additionally, the solutions described above in connection with FIGS. 1, 2A-2C and 3, provide following benefits.

1. Authentication of vDU on midhaul/backhaul when vDU and vCU are not-co-located.
2. Authorization of associations between vDU and vCU-CP/UP entities.
3. Fostering a multi-vendor ecosystem in vRAN vendors can establish authentications, authorization mechanism in completing the deployment of vRAN environments.
4. Fostering a multi-operator ecosystem for vRAN sharing.

Referring back to FIG. 1, in accordance with another embodiment, distributed ledger technology is leveraged to:

(1) Authenticate a RRU/RIU entity and identify a rogue RRU/RIU entity.
(2) Authenticate and authorize vDU to vCU-CP (control plane) association for signaling.
(3) Authenticate and authorize vDU to vCU-UP (user plane) association for user traffic.
(4) Authenticate and authorize vCU-CP and vCU-UP for uplink connectivity towards 5G core.

The interfaces BCru 152, BCdu 154 and BCcu 156 are provided to handle different messages, such as standalone authentication, public key pre-set, authorization, query/set etc.

BCru interface 152—Authentication for RRU/RIUs 104 (1)-104(M).

This allows pre-setting a blockchain key at manufacturer or Service Provider (warehouse/testing) before shipping to deployment sites. Authentication of other partners RRU/RIU entities can be achieved using whitelist concepts, similar to that described above. Entity identity is provided using blockchain messages so it can be authenticated.

BCdu interface 154—gNB DU is VNF is deployed at the edge, as described above.

During vDU VNF deployment, authentication and signing is performed (via DLT key exchange) in order to validate eCPRI interfaces between an RRU/RIU entity and a vDU. Moreover, a rogue RRU/RIU entity can be identified.

The F1-c (vDU< >vCU-CP) interface provides only one association. The BCdu interface 154 can therefore exchange authorization parameters. Similarly, the F1-u (vDU< >vCU-UP) interface provides only many associations. The BCdu can exchange authorization parameters in support thereof.

BCcu interface 156—gNB CU is VNF deployed at a regional/main datacenter.

During vDU VNF deployment we can authenticate and sign (provide with DLT key exchange). This can be used to validate eCPRI interfaces between RRU/RIU and vDU. A rogue RRU/RIU entity can be identified. The F1-c (vDU< >vCU-CP) interface provides only one association. The BCdu interface 154 can therefore exchange authorization parameters. Similarly, the F1-u (vDU< >vCU-UP) interface provides only many associations. The BCdu can exchange authorization parameters in support thereof.

RRU/RIU security: The RRU/RIU entities 104(1)-104 (M) could be deployed in unmanaged locations (such as a building wall/roof). When this occurs, an update to the distributed ledger database is made after the RRU/RIU entity is installed/connected and learns about which potential vDUs it could register with. A compliance criterion may be applied to the RRU/RIU entity, such as a particular software version etc., which may be required in order for the RRU/RIU entity to be permitted to join a particular vRAN.

By other Mobile Network Operator (MNO): The RRH/RIU entity could be rented by an MNO for a given vRAN over an owned/3rd party xHaul network based on its capabilities (e.g., type of antenna connected) and a previous vRAN of which it was a part.

vRAN smart contract—When the RRU/RIU entity becomes aware of a particular vRAN and a particular vDU (cluster) within the vRAN, the RRU/RIU entity communicates with one of the suggested vDUs of a particular vRAN. Authentication takes place via the distributed ledger and a smart contract may execute between the vDU and the RRU for the registration to complete.

Figure 4A:
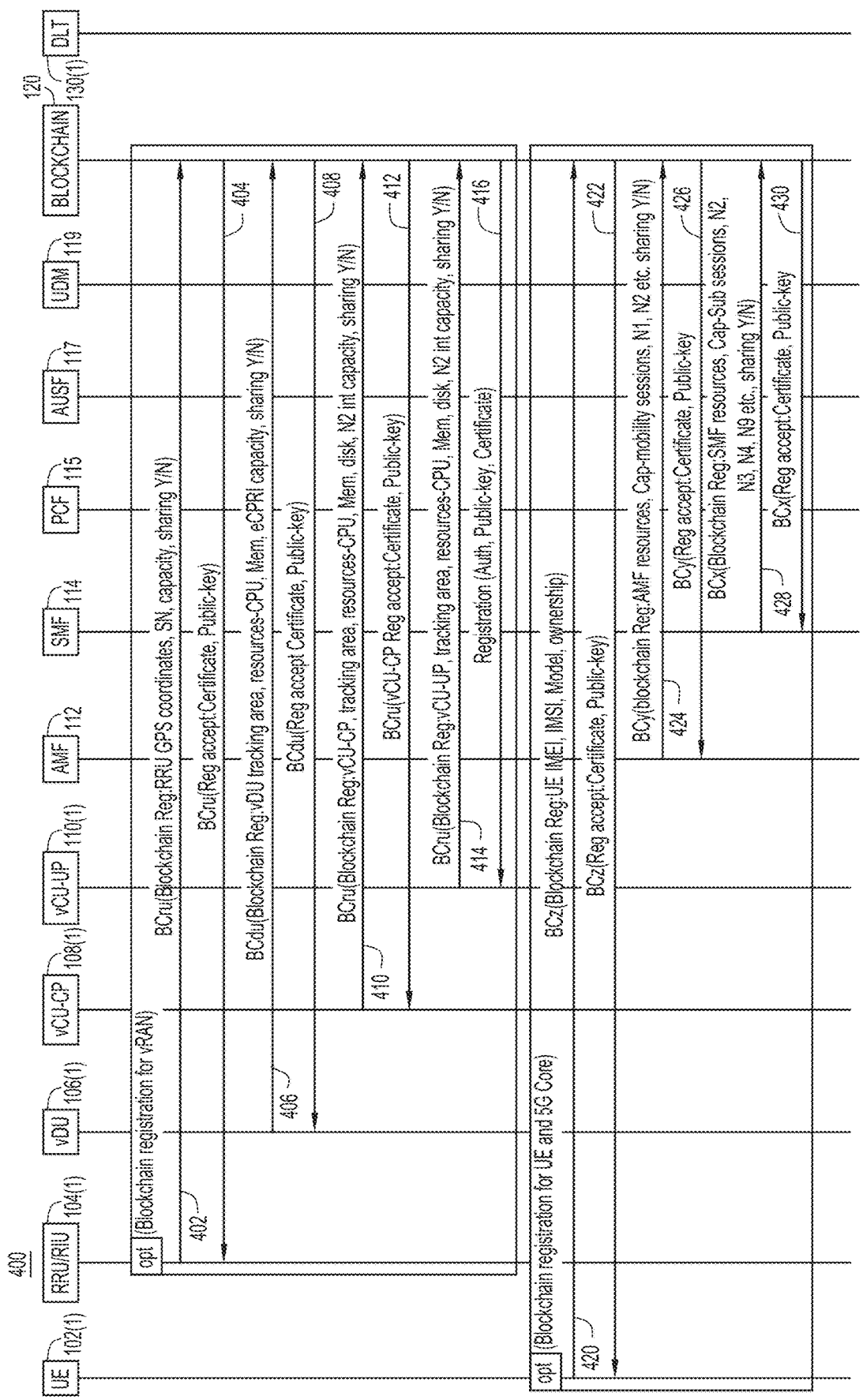
Figure 4C:
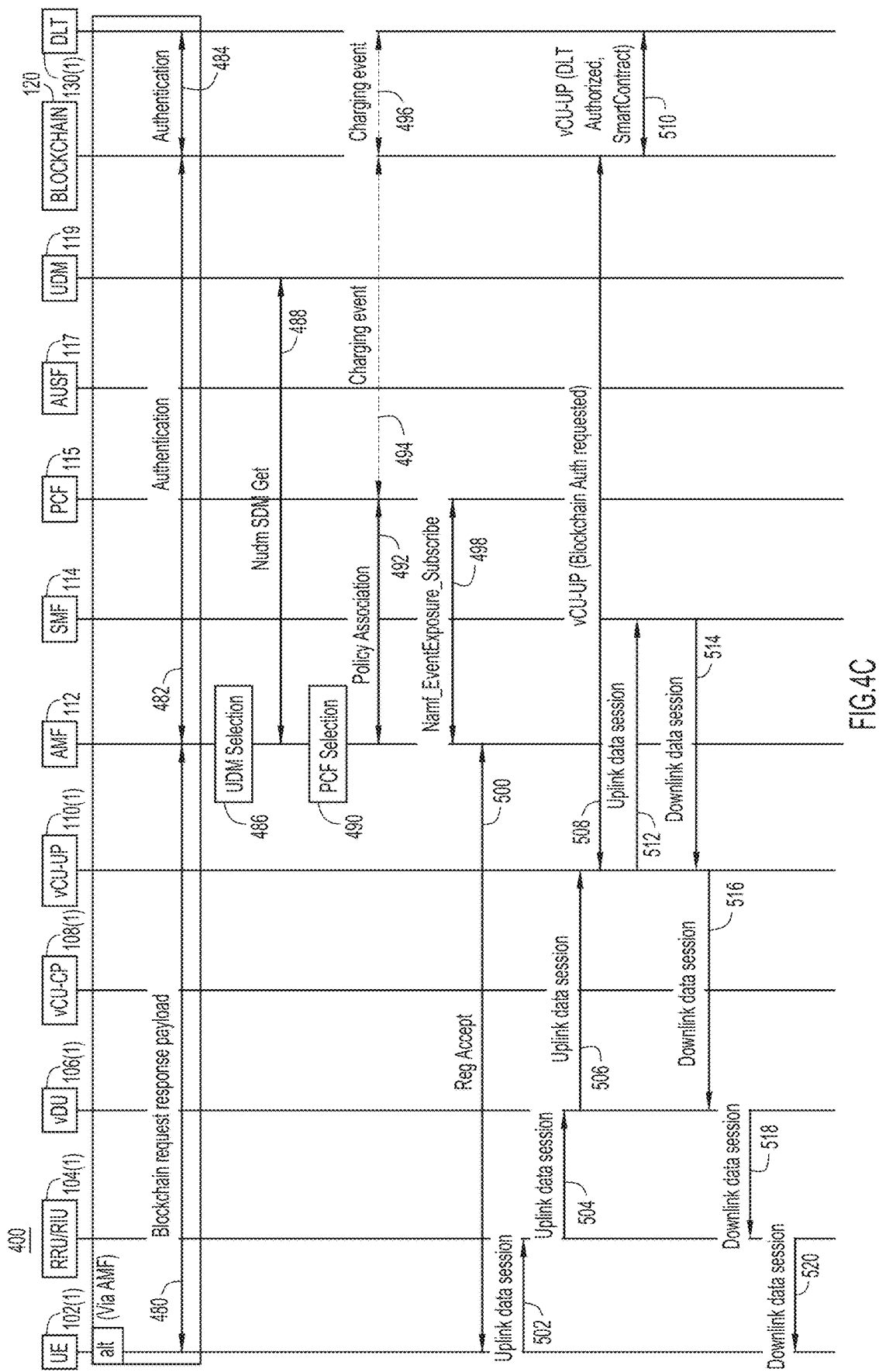

Reference is now made to FIGS. 4A-4C. FIGS. 4A-4C illustrate a message sequence of a process 400 useful to authenticate virtualized radio access network entities using blockchain techniques, in accordance with another embodiment. The message sequence of process 400 involves the interactions with a Policy Coordination Function (PCF) entity 115, an Authentication Server Function (AUSF) 117 and a Unified Data Management (UDM) entity 119.

Referring now to FIG. 4A, operations 402-416 involve blockchain registration for the vRAN. At 402, the RRU/RIU entity 104(1) sends a blockchain registration request, via the BCru interface, to the enterprise blockchain network 120. The RRU/RIU entity 104(1) sends details such as manufacturer, GPS coordinates, serial number, model number, capacity, sharing options (Y/N). This is done the first time the RRU/RIU entity 104(1) is either shipped from factory or activated into service. At 404, the enterprise blockchain network 120 sends a registration acceptance to the RRU/RIU entity 104(1). The registration acceptance includes a certificate and a Public-key. Similarly, the vDU entity 106(1) registers with the enterprise blockchain network 120 at operations 406 and 408. The vDU entity 106(1) sends the blockchain registration request using BCdu interface. It sends details such CPU, memory, capacity, sharing options (Y/N). This is done when first time vDU virtual network function (VNF) is instantiated.

The vCU-CP entity 108(1) registers with the enterprise blockchain network 120 at operations 410 and 412. The vCU-CP entity 108(1) sends the blockchain registration request using the BCcu interface. It sends details such as tracking area, resources—CPU, memory, capacity, N2 interface capacity, sharing options (Y/N) etc. This is done the first time the vCU-CP entity 108(1) is instantiated. The vCU-UP entity 110(1) registers with the enterprise blockchain network 120 at operations 414 and 416. The vCU-UP entity 110(1) sends the blockchain registration request using the BCcu interface, and the request includes details such as vCU-UP serial number, resources—CPU, memory, capacity, N2 interface capacity, sharing options (Y/N) etc. This is done the first time the vCU-UP VNF is instantiated.

Operations 420-430 involve blockchain registration for the UE and the 5G core network elements/entities. At 420, the UE sends a blockchain registration request using BCz interface. It sends details such as UE International Mobile Equipment Identity (IMEI), International Mobile Subscriber Identity IMSI, model, owners etc. This is done independently for all blockchain capable UEs if they want to use blockchain authentication to attach to 5G network. At 422, the enterprise blockchain network 120 sends a registration acceptance that includes a certificate and a Public-key. At 424, the AMF 112 sends a blockchain registration request using the BCx interface. The registration request includes details, such as AMF tracking area, resources—CPU, memory, capacity, N1, N2 interface capacity, sharing options (Y/N) etc. This is done the first time the AMF 112 is blockchain-capable and it is to be authenticated and authorized using the blockchain. At 426, the enterprise blockchain network 120 sends a registration acceptance that includes a certificate and a Public-key. At 428, the SMF 114 sends a blockchain registration request using the BCy interface. The registration request includes such details as resources—CPU, memory, capacity, N2, N3, N4, N9 interface capacity, sharing options (Y/N), etc. At 430, the enterprise blockchain network 120 sends a registration acceptance that includes a certificate and a Public-key.

Reference is now made to FIG. 4B. A blockchain-capable UE may indicate an alternative and/or complimentary authentication procedure using blockchain to augment the standard 5G Extensible Authentication Protocol (EAP)—Authentication and Key Agreement (EAP-AKA') procedure. The UE can indicate the RRC access category (TS 24.501 Table 4.5.6.1) to provide a new access category type that allows for alternative authentication types using blockchain. The RAN can use this to select an AMF that can perform the alternative authentication mechanism.

At 432, the blockchain-capable UE 102(1) follows TS 23.502 registration procedures in clause 4.2.2.2. The registration type could be enhanced to indicate guest access with dual authentication mechanisms by augmenting the registration type defined in the Non-Access Stratum (NAS) protocol, 3GPP TS 24.501. The registration type is defined in clause 9.8.3.7. Two methods are considered to perform the extended authentication mechanism. The first method uses a standard registration type and enables the follow-on (as described in clause 9.8.3.7, 5 GS registration type) attribute to follow up with an alternative authentication mechanism. The second method uses a newly defined registration type indicating a guest authenticating mechanism.

At 434, the RRU/RIU entity 104(1) sends an authorization to the blockchain network for the UE attach request. At 436, the enterprise blockchain network 120 forwards the request to the DLT service provider 130(1) which creates an entry with an immutable smart contract and provides authorization for the UE attach to proceed.

At 438, the RRU/RIU entity 104(1) sends the UE attach request to the vDU 106(1) using the eCPRI interface. At 440, the vDU 106(1) sends authorization to the blockchain network 120 for the UE attach request. At 442, the DLT service provider 130(1) creates an entry with an immutable smart contract and provides authorization for the UE attach to proceed.

The vDU 106(1) sends the UE attach request to the vCU-CP entity 108(1) using the F1-c interface, at 444. The vCU-CP entity 108(1) sends authorization to the enterprise blockchain network 120 for the UE attach request, at 446. At 448, the DLT service provider 130(1) creates an entry with an immutable smart contract and provides authorization for the UE attach to proceed.

At 450, the vCU-CP entity 108(1) can select an AMF, which in this example, is AMF 112. The vCU-CP entity 108(1) sends the UE attach request to the selected AMF, that is, AMF 112, on the N2 interface, at 452. As shown at 454, the UE capabilities indicate that it is capable of an extended authentication (alternative and/or secondary authentication) procedure (e.g., DLT-based authentication). When the AMF 112 receives this type of registration, this indicates that the UE seeks to perform an alternative and/or secondary authentication procedure using a non-3GPP authentication procedure piggy-backed over the NAS protocol. The authentication procedure could be carried in the transparent container payload of the NAS protocol. The authentication type, in this case, can be indicated in the NAS payload. At 456, the AMF 112 sends an identity request to the UE 102(1) such as a Subscription Concealed Identifier (SUCI). At 458, the UE 102(1) sends an identity response back to the AMF 112. At 460, the AMF 112 selects an AUSF, e.g., AUSF 117, for secondary authentication of the UE 102(1) based on the identity response obtained at 458.

Operations 462-476 relate to blockchain-based secondary authentication using the AUSF 117. At 462, the AMF 112 performs any additional challenge to the UE 102(1) if required. In one embodiment, at 464, the AMF 112 performs authentication procedures to the AUSF 117 based on 3GPP TS 33.501 and based on the policy in the AMF 112. At 466, the AUSF 117 is used to obtain the keys (security vector) from the UDM 119. The AMF 112 can perform the blockchain authentication using the Service Bus Architecture (SBA) Nausf service over the N12 reference point if the operator desires that the AUSF 117 be involved in the authentication function. Service-based API calls defined in 3GPP TS 29.509 and TS 29.518 are enhanced to add the messages needed to support the blockchain procedures. The AUSF 117 then completes the blockchain authentication with the UDM 119, to confirm whether or not the UE's credentials can be accepted. This is an extension to the operation from clause 6.1.3 of TS 33.501. The AUSF 117 may perform secondary authentication using the blockchain based on additional flags/parameters sent by the UE 102(1).

At 468, the EAP challenge/response exchange between the AUSF 117 and the AMF 112 completes the blockchain authentication of the AMF 112 with the blockchain network represented by the BCy interface 158 shown in FIG. 1. This is an interface introduced to support blockchain related authentication parameters, and involves an extension to the call flow associated with clause 6.1.3 of TS 33.501.

At 470, the AMF 112 and UE 102(1) perform an EAP challenge/response with the blockchain payload. At 472, the AMF 112 can perform blockchain authentication using the Nausf service over the N12 reference point if the operator desires the AUSF 117 involved in the authentication function. Service-based API calls defined in 3GPP TS 29.509 and 29.518 may be enhanced to add the messages needed to support the blockchain procedures.

As an alternative, at 474, the AMF 112 can directly communicate with the blockchain network 120 as long as the AMF 112 has successfully obtained from the AUSF 117 or UDM 119 the keys needed to perform encryption and integrity protection. At 476, the AMF 112 selects the DLT service provider, e.g., DLT service provider 130(1), based on the UE's blockchain identifier (provided previously) and completes the transaction with the DLT service provider 130(1), by considering the UE 102(1) as a client of the DLT service provider 130(1). The UE 102(1) has already registered and subscribed to the DLT service provider 130(1) using the blockchain interface BCz 150 shown in FIG. 1. At 478, the AMF 112 sends the blockchain response payload back to the UE 102(1).

Reference is now made to FIG. 4C. Operations 480-484 relate to blockchain secondary authentication using the AMF 112. At 480 and 482, the AMF 112 registers the UE 102(1) with the UDM 119, as per the TS 23.502 specification. The AMF 112 may choose to set up the UE's mobility management such that it needs credit authorization from the DLT service provider 130(1). Only after the DLT service provider 130(1) has confirmed that the UE's credit is worthy will the AMF 112 allow the UE 102(1) to be attached and continue with other procedures.

Operations 486, 488, 490, 492, 494, 496, 498, 500, 502, 504 and 506 relate to establishing an uplink packet data session based on TS 23.502. As such, these operations are not described in detail herein.

At 508, when the vCU-UP 110(1) receive a data session request (from operation 506), the vCU-UP 110(1) authorizes with the blockchain network 120 using previously stored credentials (obtained at operation 416, FIG. 4A). At 510, the blockchain network 120 obtains authorizations from the DLT service provider 130(1) in the form of smart contract which provides entitlements of vCU-UP resources availability (CPU, memory, available bandwidth etc.) and related consumption parameters (bandwidth, CPU, memory resources).

Operations 512, 514, 516, 518 and 520 relate to establishing a downlink packet data session, based on TS 23.502. These operations are therefore not described in detail herein.

The process 400 depicted in FIGS. 4A-4C provide several benefits, including:
2. Authentication and identification of rogue RRU/RIU.
3. Authentication of RRU/RIU on fronthaul (e.g. eCPRI) so that unknown devices are not allowed to integrate to vDU.
4. Authentication of vDU on mid-haul/backhaul when vDU and vCU are not co-located.
5. Authorization of associations between vDU and vCU-CP/UP etc.

Figure 5:
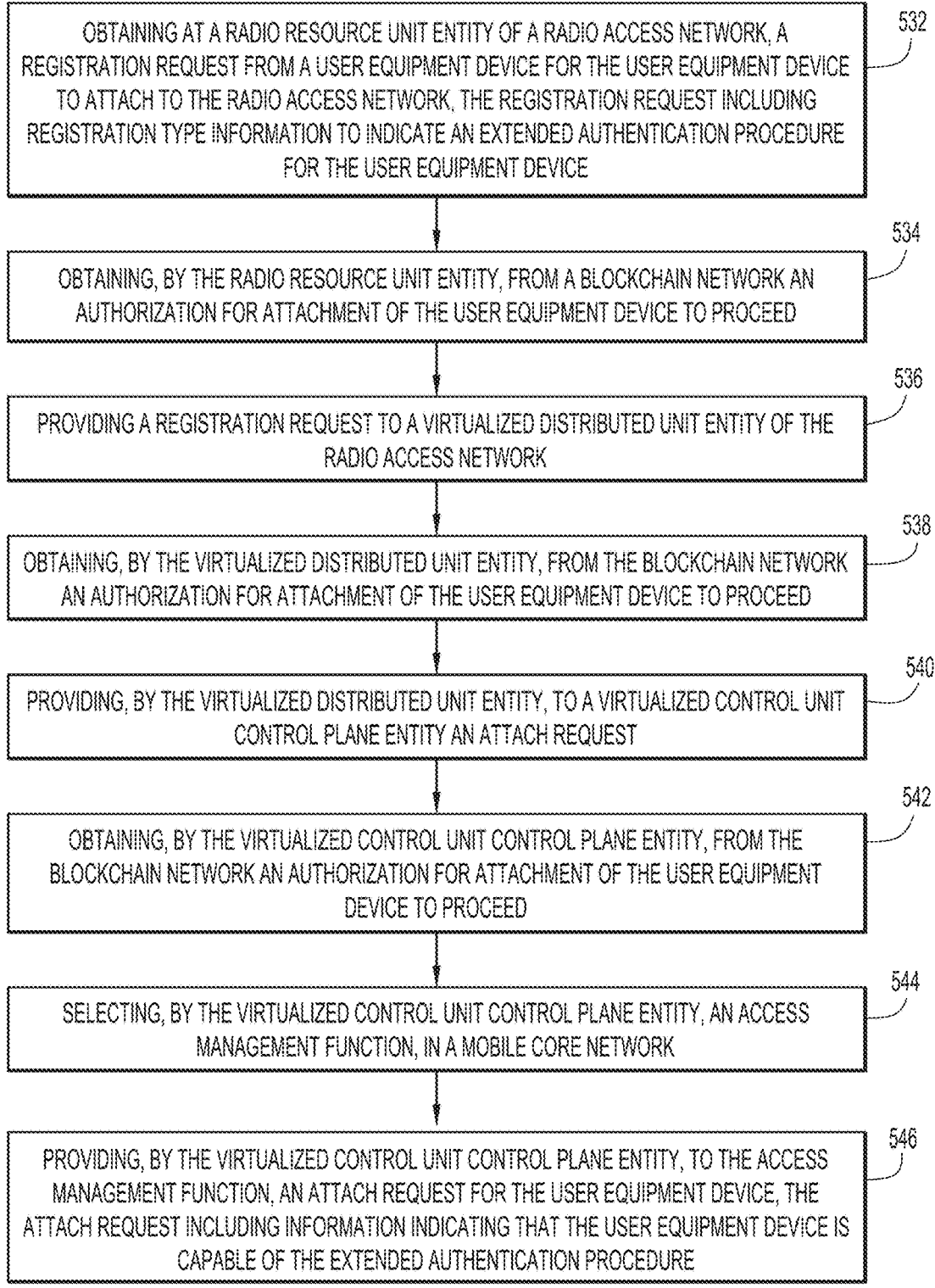
FIG. 5 is a flow chart depicting a method for blockchain authenticating virtualized radio access network components, according to an example embodiment.

Reference is now made to FIG. 5 for description of a method 530 that is based on the concepts presented in connection with FIGS. 4A-4C. The method 530 includes, at 532, obtaining at a radio resource unit entity of a radio access network, a registration request from a user equipment device for the user equipment device to attach to the radio access network, the registration request including registration type information to indicate an extended authentication procedure for the user equipment device. At 534, the radio resource entity obtains from a distributed ledger an authorization for attachment of the user equipment device to proceed. At 536, the radio resource unit entity provides a registration request to a virtual distributed unit entity of the radio access network. At 538, the virtualized distributed unit obtains from the distributed ledger an authorization for attachment of the user equipment device to proceed. At 540, the virtualized distributed unit entity provides to a virtual control unit control plane entity an attach request. At 542, the virtualized control unit control plane entity obtains from the distributed ledger an authorization for attachment of the user equipment device to proceed. At 544, the virtualized control unit control plane entity selects an access management function in a mobile core network. At 546, the virtualized control unit control plane entity provides to the access management function, an attach request for the user equipment device, the attach request including information indicating that the user equipment device is capable of the extended authentication procedure.

As described above in connection with FIGS. 4A-4C, in one example embodiment, the registration type information included in the registration request indicates one of first and second extended authentication methods, wherein the first method uses a standard registration type and includes a follow-on attribute to indicate follow up with an alternative authentication procedure, and the second method uses a specifically defined registration type indicating a guest authentication procedure.

In an example embodiment, the registration type information is an augmentation of a registration type defined in the Non-Access Stratum (NAS) protocol.

In an example embodiment, the method 530 may further include: providing, by the access management function, an identity request to the user equipment device; obtaining, at the access management function, an identity response from the user equipment device; and selecting, by the access management function, an authentication server function in the mobile core network, based on the identity response from the user equipment device.

In an example embodiment, the method 530 may further include performing, by the authentication server function, operations for secondary authentication of the attach request of the user equipment device. An example of such operations are shown in FIG. 4B at 462-476.

In an example embodiment, the method 530 may further include performing, by the access management function, operations for secondary authentication of the attach request of the user equipment device. An example of such operations are shown in FIG. 4C at 480-484.

FIG. 6 illustrates a hardware block diagram of a computing device 600 that may serve perform the functions of any of the servers or computing or control entities referred to herein in connection with FIGS. 1, 2A-2C, 3, 4A-4C and 5. It should be appreciated that FIG. 6 provides only an illustration of one embodiment and does not imply any limitations with regard to the environments in which different embodiments may be implemented. Many modifications to the depicted environment may be made.

As depicted, the device 600 includes a bus 612, which provides communications between computer processor(s) 614, memory 616, persistent storage 618, communications unit 620, and input/output (I/O) interface(s) 622. Bus 612 can be implemented with any architecture designed for passing data and/or control information between processors (such as microprocessors, communications and network processors, etc.), system memory, peripheral devices, and any other hardware components within a system. For example, bus 612 can be implemented with one or more buses.

Memory 616 and persistent storage 618 are computer readable storage media. In the depicted embodiment, memory 616 includes random access memory (RAM) 624 and cache memory 626. In general, memory 616 can include any suitable volatile or non-volatile computer readable storage media.

One or more programs may be stored in persistent storage 618 for execution by one or more of the respective computer processors 614 via one or more memories of memory 616. The persistent storage 618 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information. For example, the one or more programs may include software instructions for Distributed Ledger-based Authentication and Authorization Control Logic 617 that, when executed by the one or more processors 614, cause the computing device 600 to perform the operations of any of the entities referred to in connection with FIGS. 1, 2A-2C, 3, 4A-4C and 5.

The media used by persistent storage 618 may also be removable. For example, a removable hard drive may be used for persistent storage 618. Other examples include optical and magnetic disks, thumb drives, and smart cards that are inserted into a drive for transfer onto another computer readable storage medium that is also part of persistent storage 618.

Communications unit 620, in these examples, provides for communications with other data processing systems or devices. In these examples, communications unit 620 includes one or more network interface cards. Communications unit 620 may provide communications through the use of either or both physical and wireless communications links.

I/O interface(s) 622 allows for input and output of data with other devices that may be connected to computer device 600. For example, I/O interface 622 may provide a connection to external devices 628 such as a keyboard, keypad, a touch screen, and/or some other suitable input device. External devices 628 can also include portable computer readable storage media such as database systems, thumb drives, portable optical or magnetic disks, and memory cards.

Software and data used to practice embodiments can be stored on such portable computer readable storage media and can be loaded onto persistent storage 618 via I/O interface(s) 622. I/O interface(s) 622 may also connect to a display 630. Display 630 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). The database system may be included within or coupled to the server and/or client systems. The database systems and/or storage structures may be remote from or local to the computer or other processing systems, and may store any desired data (e.g., data relating to contact center interaction routing).

The present embodiments may employ any number of any type of user interface (e.g., Graphical User Interface (GUI), command-line, prompt, etc.) for obtaining or providing information (e.g., data relating to providing enhanced delivery options), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as C++, Python, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In one form, a method is provided comprising: registering with a distributed ledger a first radio access network (RAN) entity of a first vendor and a second RAN entity of a second vendor; obtaining a request from the first RAN entity of the first vendor to use resources of the second RAN entity of the second vendor; validating with the distributed ledger whether the first RAN entity of the first vendor and the second RAN entity of the second vendor have been registered with the distributed ledger and are to share resources; and based on the validating, providing to the second RAN entity of the second vendor a notification that the first RAN entity of the first vendor is to be permitted to share resources of the second RAN entity of the second vendor.

In another form, an apparatus is provided comprising: an interface configured to enable communication with one or more radio access network entities in a radio access network; and a processor coupled to the interface, wherein the processor is configured to perform operations including: registering with a distributed ledger a first radio access network (RAN) entity of a first vendor and a second RAN entity of a second vendor; obtaining a request from the first RAN entity of the first vendor to use resources of the second RAN entity of the second vendor; validating with the distributed ledger whether the first RAN entity of the first vendor and the second RAN entity of the second vendor have been registered with the distributed ledger and are to share resources; and based on the validating, providing to the second RAN entity of the second vendor a notification that the first RAN entity of the first vendor is to be permitted to share resources of the second RAN entity of the second vendor.

In yet another form, one or more non-transitory computer readable storage media are provided, encoded with software comprising computer executable instructions and when the software is executed operable to perform operations including: registering with a distributed ledger a first radio access network (RAN) entity of a first vendor and a second RAN entity of a second vendor; obtaining a request from the first RAN entity of the first vendor to use resources of the second RAN entity of the second vendor; validating with the distributed ledger whether the first RAN entity of the first vendor and the second RAN entity of the second vendor have been registered with the distributed ledger and are to share resources; and based on the validating, providing to the second RAN entity of the second vendor a notification that the first RAN entity of the first vendor is to be permitted to share resources of the second RAN entity of the second vendor.

In accordance with still another aspect, a method is provided comprising: obtaining at a radio resource unit entity of a radio access network, a registration request from a user equipment device for the user equipment device to attach to the radio access network, the registration request including registration type information to indicate an extended authentication procedure for the user equipment device; obtaining, by the radio resource unit entity, from a distributed ledger an authorization for attachment of the user equipment device to proceed; providing, by the radio resource unit entity, a registration request to a virtual distributed unit entity of the radio access network; obtaining, by the virtualized distributed unit entity, from the distributed ledger an authorization for attachment of the user equipment device to proceed; providing, by the virtualized distributed unit entity, to a virtual control unit control plane entity an attach request; obtaining, by the virtualized control unit control plane entity, from the distributed ledger an authorization for attachment of the user equipment device to proceed; selecting, by the virtualized control unit control plane entity, an access management function, in a mobile core network; and providing, by the virtualized control unit control plane entity, to the access management function, an attach request for the user equipment device, the attach request including information indicating that the user equipment device is capable of the extended authentication procedure.

In another form, an apparatus is provided comprising: an interface configured to enable communication with one or more radio access network entities in a radio access network; and a processor coupled to the interface, wherein the processor is configured to perform operations including: obtaining at a radio resource unit entity of a radio access network, a registration request from a user equipment device for the user equipment device to attach to the radio access network, the registration request including registration type information to indicate an extended authentication procedure for the user equipment device; obtaining, by the radio resource unit entity, from a distributed ledger an authorization for attachment of the user equipment device to proceed; providing, by the radio resource unit entity, a registration request to a virtual distributed unit entity of the radio access network; obtaining, by the virtualized distributed unit entity, from the distributed ledger an authorization for attachment of the user equipment device to proceed; providing, by the virtualized distributed unit entity, to a virtual control unit control plane entity an attach request; obtaining, by the virtualized control unit control plane entity, from the distributed ledger an authorization for attachment of the user equipment device to proceed; selecting, by the virtualized control unit control plane entity, an access management function, in a mobile core network; and providing, by the virtualized control unit control plane entity, to the access management function, an attach request for the user equipment device, the attach request including information indicating that the user equipment device is capable of the extended authentication procedure.

In still another form, one or more non-transitory computer readable storage media are provided, encoded with software comprising computer executable instructions and when the software is executed operable to perform operations including: obtaining at a radio resource unit entity of a radio access network, a registration request from a user equipment device for the user equipment device to attach to the radio access network, the registration request including registration type information to indicate an extended authentication procedure for the user equipment device; obtaining, by the radio resource unit entity, from a distributed ledger an authorization for attachment of the user equipment device to proceed; providing, by the radio resource unit entity, a registration request to a virtual distributed unit entity of the radio access network; obtaining, by the virtualized distributed unit entity, from the distributed ledger an authorization for attachment of the user equipment device to proceed; providing, by the virtualized distributed unit entity, to a virtual control unit control plane entity an attach request; obtaining, by the virtualized control unit control plane entity, from the distributed ledger an authorization for attachment of the user equipment device to proceed; selecting, by the virtualized control unit control plane entity, an access management function, in a mobile core network; and providing, by the virtualized control unit control plane entity, to the access management function, an attach request for the user equipment device, the attach request including information indicating that the user equipment device is capable of the extended authentication procedure.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   obtaining at a radio resource unit entity of a radio access network, a registration request from a user equipment device for the user equipment device to attach to the radio access network, the registration request including registration type information to indicate an extended authentication procedure for the user equipment device;
   obtaining, by the radio resource unit entity, from a distributed ledger an authorization for attachment of the user equipment device to proceed;
   providing, by the radio resource unit entity, the registration request to a virtual distributed unit entity of the radio access network;
   obtaining, by a virtualized distributed unit entity, from the distributed ledger an authorization for attachment of the user equipment device to proceed;
   providing, by the virtualized distributed unit entity, to a virtual control unit control plane entity an attach request;
   obtaining, by a virtualized control unit control plane entity, from the distributed ledger an authorization for attachment of the user equipment device to proceed;
   selecting, by the virtualized control unit control plane entity, an access management function, in a mobile core network; and
   providing, by the virtualized control unit control plane entity, to the access management function, an attach request for the user equipment device, the attach request including information indicating that the user equipment device is capable of the extended authentication procedure.

2. The method of claim 1, wherein the registration type information included in the registration request indicates one of first extended authentication method and a second extended authentication method, wherein the first extended authentication method uses a standard registration type and includes a follow-on attribute to indicate follow up with an alternative authentication procedure, and the second extended authentication method uses a specifically defined registration type indicating a guest authentication procedure.

3. The method of claim 1, wherein the registration type information is an augmentation of a registration type defined in a Non-Access Stratum (NAS) protocol.

4. The method of claim 1, further comprising:
   providing, by the access management function, an identity request to the user equipment device;
   obtaining, at the access management function, an identity response from the user equipment device; and
   selecting, by the access management function, an authentication server function in the mobile core network, based on the identity response from the user equipment device.

5. The method of claim 4, further comprising:
performing, by the authentication server function, a sequence of operations for secondary authentication of the attach request of the user equipment device.

6. The method of claim 1, further comprising:
performing, by the access management function, operations for secondary authentication of the attach request of the user equipment device.

7. The method of claim 1, wherein prior to obtaining, by the virtualized control unit control plane entity, from the distributed ledger the authorization for attachment of the user equipment device to proceed, the distributed ledger creates an entry with an immutable smart contract associated with the authorization for attachment of the user equipment device to proceed.

8. One or more non-transitory computer readable storage media encoded with software comprising computer executable instructions and when the software is executed operable to perform operations including:
obtaining at a radio resource unit entity of a radio access network, a registration request from a user equipment device for the user equipment device to attach to the radio access network, the registration request including registration type information to indicate an extended authentication procedure for the user equipment device;
obtaining, by the radio resource unit entity, from a distributed ledger an authorization for attachment of the user equipment device to proceed;
providing, by the radio resource unit entity, a registration request to a virtual distributed unit entity of the radio access network;
obtaining, by a virtualized distributed unit entity, from the distributed ledger an authorization for attachment of the user equipment device to proceed;
providing, by the virtualized distributed unit entity, to a virtual control unit control plane entity an attach request;
obtaining, by a virtualized control unit control plane entity, from the distributed ledger an authorization for attachment of the user equipment device to proceed;
selecting, by the virtualized control unit control plane entity, an access management function, in a mobile core network; and
providing, by the virtualized control unit control plane entity, to the access management function, an attach request for the user equipment device, the attach request including information indicating that the user equipment device is capable of the extended authentication procedure.

9. The non-transitory computer readable storage media of claim 8, wherein the registration type information included in the registration request indicates one of first extended authentication method and a second extended authentication method, wherein the first extended authentication method uses a standard registration type and includes a follow-on attribute to indicate follow up with an alternative authentication procedure, and the second extended authentication method uses a specifically defined registration type indicating a guest authentication procedure.

10. The non-transitory computer readable storage media of claim 8, wherein the registration type information is an augmentation of a registration type defined in a Non-Access Stratum (NAS) protocol.

11. The non-transitory computer readable storage media of claim 8, wherein the instructions for registering include instructions for performing operations including:
providing, by the access management function, an identity request to the user equipment device;
obtaining, at the access management function, an identity response from the user equipment device; and
selecting, by the access management function, an authentication server function in the mobile core network, based on the identity response from the user equipment device.

12. The non-transitory computer readable storage media of claim 11, wherein the instructions for registering include instructions for performing operations including:
performing, by the authentication server function, a sequence of operations for secondary authentication of the attach request of the user equipment device.

13. The non-transitory computer readable storage media of claim 8, wherein the instructions for registering include instructions for performing operations including:
performing, by the access management function, operations for secondary authentication of the attach request of the user equipment device.

14. A system comprising:
at least one memory element for storing data; and
at least one processor for executing instructions associated with the data, wherein executing the instructions causes the system to perform operations, comprising:
obtaining at a radio resource unit entity of a radio access network, a registration request from a user equipment device for the user equipment device to attach to the radio access network, the registration request including registration type information to indicate an extended authentication procedure for the user equipment device;
obtaining, by the radio resource unit entity, from a distributed ledger an authorization for attachment of the user equipment device to proceed;
providing, by the radio resource unit entity, a registration request to a virtual distributed unit entity of the radio access network;
obtaining, by a virtualized distributed unit entity, from the distributed ledger an authorization for attachment of the user equipment device to proceed;
providing, by the virtualized distributed unit entity, to a virtual control unit control plane entity an attach request;
obtaining, by a virtualized control unit control plane entity, from the distributed ledger an authorization for attachment of the user equipment device to proceed;
selecting, by the virtualized control unit control plane entity, an access management function, in a mobile core network; and
providing, by the virtualized control unit control plane entity, to the access management function, an attach request for the user equipment device, the attach request including information indicating that the user equipment device is capable of the extended authentication procedure.

15. The system of claim 14, wherein the registration type information included in the registration request indicates one of first extended authentication method and a second extended authentication method, wherein the first extended authentication method uses a standard registration type and includes a follow-on attribute to indicate follow up with an alternative authentication procedure, and the second extended authentication method uses a specifically defined registration type indicating a guest authentication procedure.

16. The system of claim 15, wherein the registration type information is an augmentation of a registration type defined in a Non-Access Stratum (NAS) protocol.

17. The system of claim 15, wherein executing the instructions causes the system to perform further operations, comprising:
providing, by the access management function, an identity request to the user equipment device;
obtaining, at the access management function, an identity response from the user equipment device; and
selecting, by the access management function, an authentication server function in the mobile core network, based on the identity response from the user equipment device.

18. The system of claim 17, wherein executing the instructions causes the system to perform further operations, comprising:
performing, by the authentication server function, a sequence of operations for secondary authentication of the attach request of the user equipment device.

19. The system of claim 15, wherein executing the instructions causes the system to perform further operations, comprising:
performing, by the access management function, operations for secondary authentication of the attach request of the user equipment device.

20. The system of claim 15, wherein prior to obtaining, by the virtualized control unit control plane entity, from the distributed ledger the authorization for attachment of the user equipment device to proceed, the distributed ledger creates an entry with an immutable smart contract associated with the authorization for attachment of the user equipment device to proceed.

* * * * *